United States Patent
Wang et al.

(10) Patent No.: US 11,682,931 B2
(45) Date of Patent: Jun. 20, 2023

(54) WIRELESS CHARGER, SYSTEM AND METHOD

(71) Applicant: NXP USA, Inc., Austin, TX (US)

(72) Inventors: Dechang Wang, Suzhou (CN); Jan Horak, Velka Polom (CZ); Li Wang, Suzhou (CN); Wei Cao, Suzhou (CN); Ruyang Sheng, Suzhou (CN); Dengyu Jiang, Suzhou (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/807,980

(22) Filed: Jun. 21, 2022

(65) Prior Publication Data
US 2022/0416589 A1 Dec. 29, 2022

(30) Foreign Application Priority Data
Jun. 25, 2021 (CN) .......................... 202110715668.4

(51) Int. Cl.
*H02J 50/80* (2016.01)
*H02J 50/10* (2016.01)

(52) U.S. Cl.
CPC .............. *H02J 50/80* (2016.02); *H02J 50/10* (2016.02)

(58) Field of Classification Search
None
See application file for complete search history.

(56) References Cited

U.S. PATENT DOCUMENTS

| | | | |
|---|---|---|---|
| 8,299,753 B2 | 10/2012 | Hui | |
| 9,620,996 B2 | 4/2017 | Zeine et al. | |
| 2016/0226400 A1* | 8/2016 | Boys | H02M 1/36 |
| 2018/0109152 A1* | 4/2018 | Chen | H02J 50/60 |
| 2018/0323637 A1* | 11/2018 | Katabi | H04B 5/0081 |
| 2019/0326782 A1* | 10/2019 | Graham | H02J 50/90 |
| 2020/0359468 A1* | 11/2020 | Jung | H05B 1/0266 |
| 2020/0381960 A1* | 12/2020 | Goodchild | H04B 5/0075 |
| 2021/0028651 A1* | 1/2021 | Goodchild | G01P 15/00 |
| 2021/0352774 A1* | 11/2021 | Choi | H05B 6/065 |

* cited by examiner

*Primary Examiner* — Daniel Kessie

(57) ABSTRACT

A wireless charger includes a plurality of charging units for charging wirelessly chargeable devices. Each charging unit includes one or more transmit coils for producing a wireless charging signal. Each charging unit also includes a driver circuit for driving the one or more transmit coils. The driver circuit is switchable according to a charging PWM duty cycle of that charging unit. Each charging unit is operable to perform a Q factor measurement by injecting excitation energy into the one or more transmit coils of that charging unit to produce a free resonance signal, and measuring a decay rate of the free resonance signal. Each charging unit is operable to alter its charging PWM duty cycle during a time window in which another charging unit of the wireless charger is performing a Q factor measurement.

15 Claims, 6 Drawing Sheets

WIRELESS CHARGER, SYSTEM AND METHOD

CROSS-REFERENCE TO RELATED APPLICATIONS

This application claims the priority under 35 U.S.C. § 119 of China application no. 202110715668.4, filed on 25 Jun. 2021, the contents of which are incorporated by reference herein.

BACKGROUND

The present specification relates to a wireless charger for simultaneous wireless charging of multiple wirelessly chargeable devices, to a wireless charging system comprising the wireless charger and at least one wirelessly chargeable device, and to a wireless charging method for simultaneous charging of wirelessly chargeable devices.

In multi-device wireless charging system, one wireless charging device (transmitter) can be used for simultaneous charging of multiple devices to be charged.

Q factors are an important parameter used in electromagnetic induction wireless charging systems. One effective way of measuring a Q factor is to measure the attenuation rate of an LC free resonance signal.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a wireless charger for simultaneous wireless charging of multiple wirelessly chargeable devices, the wireless charger comprising:
a plurality of charging units, each charging unit for charging a respective one of the wirelessly chargeable devices, each charging unit comprising:
one or more transmit coils for producing a wireless charging signal; and
a driver circuit for driving the one or more transmit coils of that charging unit, the driver circuit comprising at least one transistor, wherein each transistor is switchable according to a charging pulse width modulation, "PWM", duty cycle of that charging unit,
wherein each charging unit is operable to perform a Q factor measurement for measuring a Q factor associated with the one or more transmit coils of that charging unit by:
injecting excitation energy into the one or more transmit coils of that charging unit to produce a free resonance signal; and
measuring a decay rate of the free resonance signal, and wherein each charging unit is operable to alter its charging PWM duty cycle during a time window in which another charging unit of the wireless charger is performing a Q factor measurement, for reducing interference from the wireless charging signal of that charging unit in the free resonance signal produced by the other charging unit.

According to another aspect of the present disclosure, there is provided a wireless charging method for simultaneous charging of wirelessly chargeable devices, the method comprising:

a first charging unit of a wireless charger performing a Q factor measurement for measuring a Q factor associated with one or more transmit coils of that charging unit by:
injecting excitation energy into the one or more transmit coils of that charging unit to produce a free resonance signal; and
measuring a decay rate of the free resonance signal, and
at least one other charging unit of the wireless charger, during a time window in which the first charging unit is performing the Q factor measurement:
altering a charging pulse width modulation, "PWM", duty cycle of that charging unit for reducing interference from the wireless charging signal of that charging unit in the free resonance signal produced by the first charging unit.

The time window may be in the range 1-200 µs. In some embodiments, the time window may be in the range 1-100 µs.

Each charging unit may be operable to alter its charging PWM duty cycle during the time window by reducing the duty cycle.

Each charging unit may be operable to alter its charging PWM duty cycle during the time window by reducing the duty cycle by at least 50%.

Each charging unit may be operable to alter its charging PWM duty cycle during the time window by reducing the duty cycle to substantially zero.

Each charging unit may be operable to increase its charging PWM duty cycle to a predetermined charging PWM duty cycle after the time window has passed.

The wireless charger may further include circuitry for, while a first charging unit of the wireless charger is performing a Q factor measurement, discharging energy from the one or more transmit coils of each other charging unit of the wireless charger.

According to a further aspect of the present disclosure, there is provided a wireless charging system comprising a wireless charger of the kind set out above and at least one wirelessly chargeable device.

The wirelessly chargeable device may include a capacitor for storing energy to drive charging circuitry of the wirelessly chargeable device during the time window.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
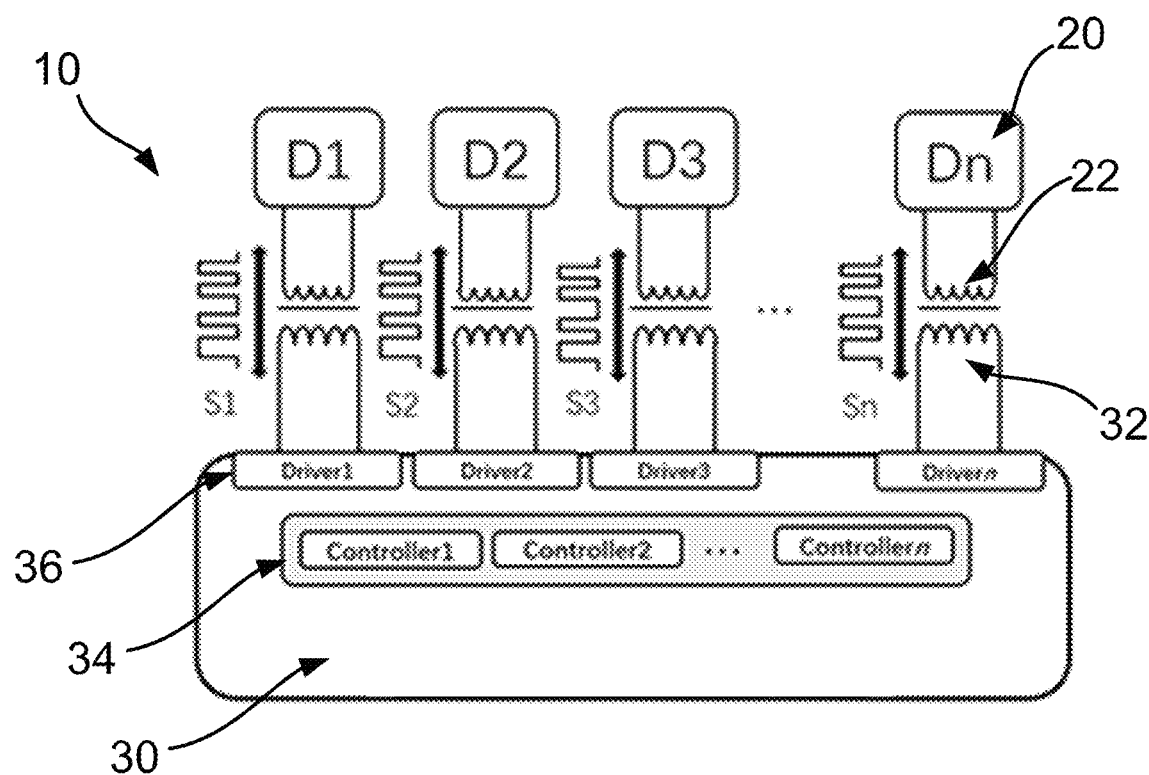
FIG. 1 shows an example of a wireless charging system for charging multiple devices.

FIG. 1 shows an example of a wireless charging system 10 for charging multiple devices. The system includes a wireless charger 30. The system 10 also includes a number of wirelessly chargeable devices 20, which are labelled D1, D2, D3 . . . Dn. The system has a plurality of charging channels, each of which may be used to charge a respective one of the wirelessly chargeable devices 20. The wireless charging signal of each channel is denoted S1, S2, S3 . . . Sn in FIG. 1. The wireless charger 30 may include one or more transmit coils 32 for each channel, for transmitting the wireless charging signal of that channel. Each channel may include a respective driver 36, for driving the one or more transmit coils for that channel. The drivers 36 may operate under the control of respective controllers 34. Each wirelessly chargeable device 20 may include one or more receive coils 22, for receiving the wireless charging signal.

Figure 2:
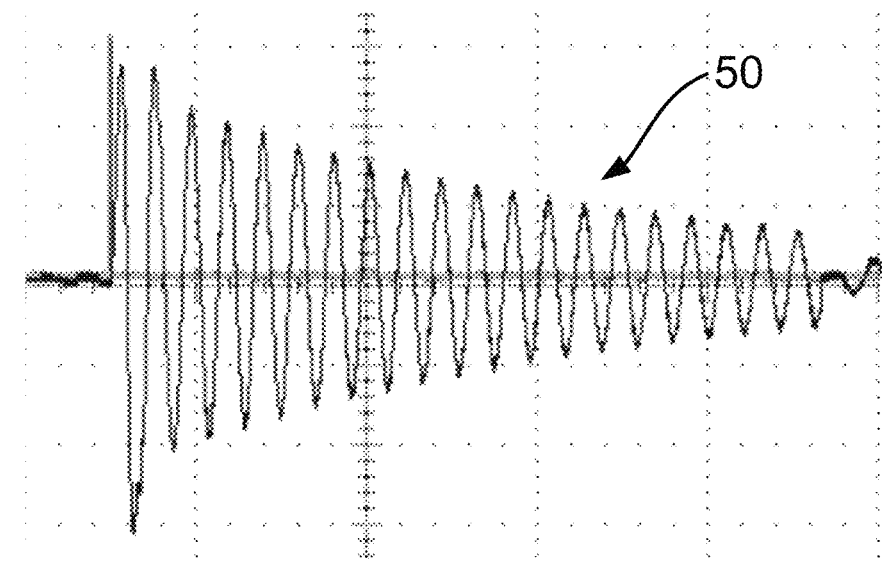
FIG. 2 shows a Q resonance curve.

Wireless charging systems such as those shown in FIG. 1 may be operable to use free resonance curves to measure the Q factor associated with the transmit coils 32 (coupled to the receive coils 22) of the charging channels. These measurements may be used, for instance, to determine the presence of foreign objects (FOs) in the vicinity of the coils 32, 22, which may adversely affect the wireless charging process. This measurement involves injecting excitation energy (e.g. in the form of a pulse) into the one or more transmit coils 32 of a channel, to produce a free resonance signal of the kind shown in FIG. 2. In FIG. 2, the signal 50 passing between the transmit coils 32 and the receive coils 22 of a channel is plotted as a function of time. The signal 50 may be a current or voltage signal in the LC circuit, which may be determined by the injected energy pulse and transmitter and receiver's resonance tank. As can be seen in FIG. 2, the free resonance curve decays as a function of time. The rate of decay may be used to determine the Q factor.

In wireless charging systems 10 such as those shown in FIG. 1, the presence of neighbouring charging channels can lead to interference in the free resonance curves used to perform Q factor measurements. This is illustrated in FIGS. 3 and 4.

Figure 3:
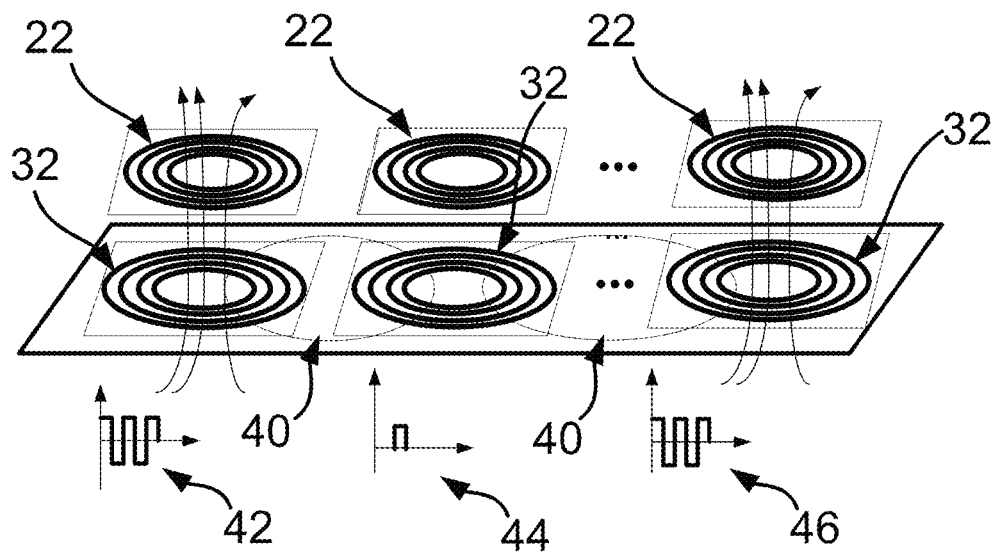
FIG. 3 shows illustrates electromagnetic interference between multiple devices in a wireless charging system and its effect on Q factor measurements.
Figure 4:
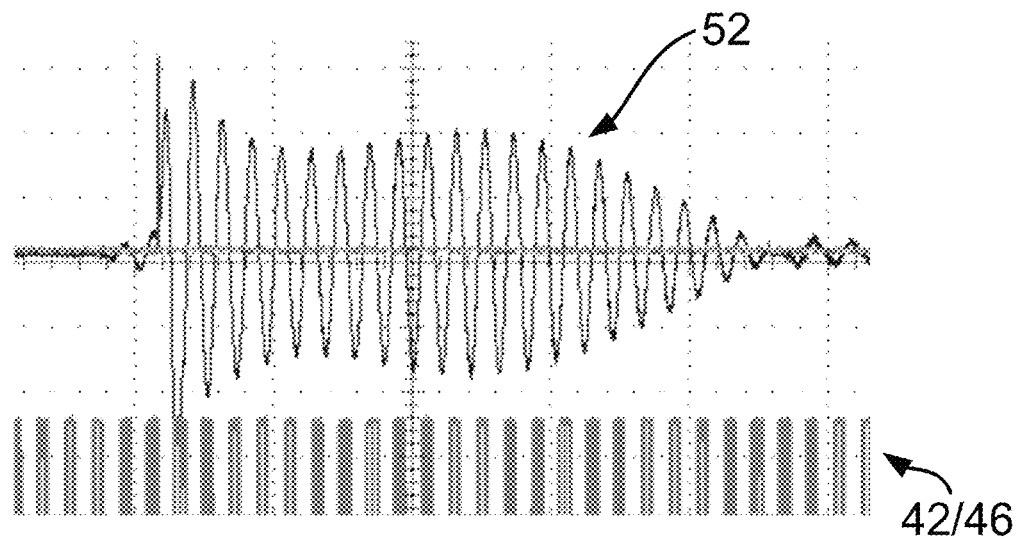
FIG. 4 shows a Q resonance curve in the presence of electromagnetic interference between devices.

In FIG. 3, one of the charging channels injects a pulse 44 into (e.g. an LC circuit associated with) the transmit coil(s) 32 of that channel, while neighbouring channels of the system are transmitting wireless charging signals (illustrated by the pulse width modulated charging signals 42, 46) from the transit coil(s) 32 of those neighbouring channels to the receive coil(s) 22 of their associated wirelessly chargeable devices 20. In FIG. 3, the electromagnetic fields associated with the wireless charging signals of the neighbouring channels of the system may extend into the regions 40, and interfere with the electromagnetic field associated with the Q factor measurement. Consequently, the free resonance curve of the channel that is performing the Q factor measurement may be distorted. FIG. 4 shows an example of the resulting resonance curve 52. As may be appreciated from a comparison of FIG. 4 with FIG. 2, measurement of the decay rate of the resonance curve 52 may no longer lead to an accurate and reliable determination of the Q factor.

One solution to the problem noted above may be to avoid performing Q factor measurements when other charging channels of the wireless charging system 10 are transmitting a wireless charging signal. However, this may inhibit the use of the wireless charging system 10 for charging multiple devices and lead to malfunctions due to the presence of foreign objects that have gone undetected.

Another solution would be to cease wireless charging operations for any neighbouring charging channels when a charging channel commences a Q factor measurement. However, this interruption of the charging process is not ideal, particularly when it is considered that the charging of a large number of devices may need to be stopped and then restarted each time one of the channels requires a Q factor measurement to be performed. Stop/start procedures may be cumbersome and time consuming.

Figure 5:
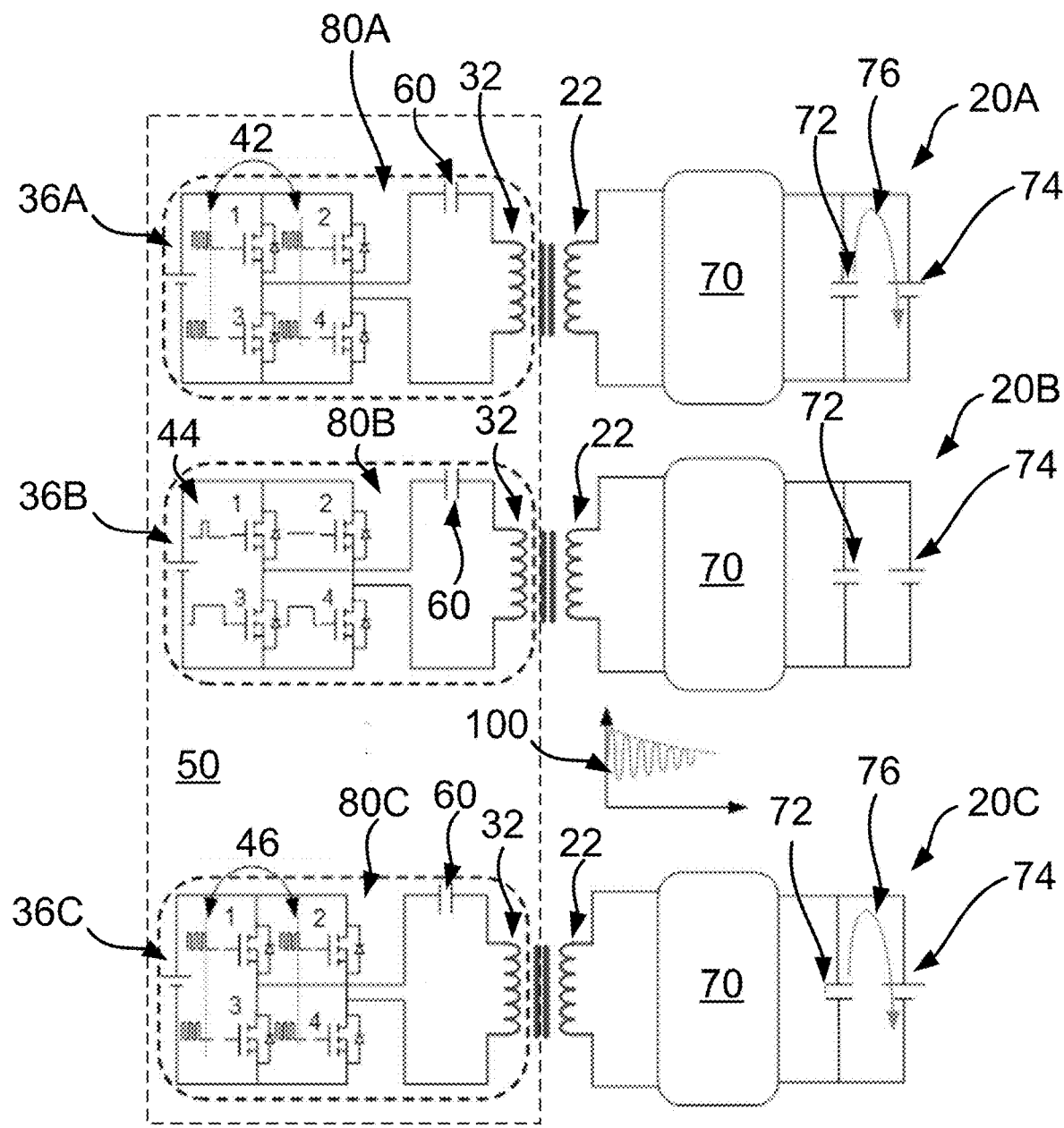
FIG. 5 illustrates the operation of a wireless charger for charging multiple devices according to an embodiment of this disclosure.

FIG. 5 illustrates the operation of a wireless charger 50 for charging multiple devices according to an embodiment of this disclosure.

The wireless charger 50 includes a plurality of charging units 80A, 80B, 80C. Although FIG. 5 shows the wireless charger 50 to have three charging units 80A, 80B, 80C, it is envisaged that any number (plurality) of charging units may be provided. Also shown in FIG. 5 are three wirelessly chargeable devices 20A, 20B, 20C. Although three wirelessly chargeable devices 20A, 20B, 20C are shown in this embodiment, it is envisaged that any number (plurality) of such devices may be provided, up to the total number of charging units provided in the wireless charger 50. The wireless charger 50 is operable to simultaneously wirelessly charge the wirelessly chargeable devices 20A, 20B, 20C. In particular, each charging unit 80A, 80B, 80C is operable to charge a respective one of the wirelessly chargeable devices 20A, 20B, 20C.

Each charging unit 80A, 80B, 80C includes one or more transmit coils 32 for producing a wireless charging signal. Each wirelessly chargeable device 20A, 20B, 20C includes a receive coil 22 for receiving the wireless charging signal from a respective one of the charging units 80A, 80B, 80C. Each wirelessly chargeable device 20A, 20B, 20C also includes a receive rectifier 70 for rectifying the wireless charging signal received by the receive coil(s) 22. Each wirelessly chargeable device 20A, 20B, 20C further includes a battery 74 to be charged by the wireless charging signal following its rectification by the rectifier 70. Note that each wirelessly chargeable device 20A, 20B, 20C further includes a (DC) charging capacitor 72. The terminals of the battery 74 and the capacitor 72 of each wirelessly chargeable device 20A, 20B, 20C may be coupled to differential outputs of the rectifier 70.

Each charging unit 80A, 80B, 80C of the wireless charger 50 may also include a capacitor 60 in series with the transmit coil(s) 32 of that charging unit 80A, 80B, 80C to form a resonant circuit for wireless power transmission.

Each charging unit 80A, 80B, 80C of the wireless charger 50 further includes a driver circuit 36A, 36B, 36C for driving the one or more transmit coils of that charging unit 80A, 80B, 80C. Each driver circuit 36A, 36B, 36C may have a differential output. A loop containing the transmit coil(s) 32 and capacitor 60 of each charging unit 80A, 80B, 80C may be coupled at each end to the differential output of the driver circuit 36A, 36B, 36C of that charging unit 80A, 80B, 80C.

Each driver circuit 36A, 36B, 36C includes one more transistors. Each transistor is switchable according to a charging pulse width modulation, "PWM", duty cycle of that charging unit 80A, 80B, 80C. Examples of the duty cycles 42, 46 of the charging units 80A, 80C are shown in FIG. 5.

It will be appreciated that the transistor(s) (which may be Field Effect Transistors (FETs)) of each driver circuit 36A, 36B, 36C may be arranged in any suitable circuit for providing a differential output signal for driving the loop containing the transmit coil(s) 32 and capacitor 60 of that charging unit 80A, 80B, 80C. In the present embodiment however, by way of illustration only, each driver circuit 36A, 36B, 36C includes four Metal Insulator Semiconductor Field Effect Transistors (MISFETs). In some embodiments, the MISFETs may be Metal Oxide Semiconductor Field Effect Transistors (MOSFETs). It is also envisaged that other kinds of Field Effect Transistors may be used (e.g. Junction Field effect Transistors (JFETs), Insulated Gate Field effect Transistors (IGFETs), Heterostructure Field effect Transistors (HFETs), Metal Semiconductor Field effect Transistors (MESFETs)). Each driver circuit 36A, 36B, 36C in this embodiment also includes a current or voltage source. The transistors of each driver circuit 36A, 36B, 36C in this embodiment are arranged in two pairs (each pair may form a half bridge). Each pair of transistors is coupled in series. The terminals of each pair are coupled to the terminals of the current or voltage source. A first intermediate node located between the transistors of a first of the pairs of transistors is coupled to a first terminal of the differential output of that driver circuit 36A, 36B, 36C. A second intermediate node located between the transistors of a second of the pairs of transistors is coupled to a second terminal of the differential output of that driver circuit 36A, 36B, 36C. A controller may be provided, for applying appropriate potentials to the gate of each transistor of the driver circuit, for producing output of the driver circuit for producing the wireless charging signal at the transmit coil(s) 32. The transistors in this embodiment form a (full) bridge circuit in each driver circuit 36A, 36B, 36C, and the signals for wireless charging produced by the bridge circuit of each driver circuit 36A, 36B, 36C may be referred to as (PWM) bridge pulses.

In accordance with embodiments of this disclosure, each charging unit 80A, 80B, 80C is operable to perform a Q factor measurement for measuring a Q factor associated with the transmit coil(s) 32 of that charging unit 80A, 80B, 80C. In the embodiment shown in FIG. 5, the charging unit 80B is shown to be in the process of performing such a Q factor measurement.

The Q factor measurement is performed by injecting excitation energy into the transmit coil(s) of the charging unit 80B, so as to produce a free resonance signal 100, and then measuring a decay rate of the free resonance signal. In some embodiments, the decaying signal may be measured using a circuit with a capacitor to sense the voltage of the resonant capacitor. In some embodiments, a conditioning circuit may be used to convert the current signal to a voltage signal for ADC sampling in a micro-controller. In some other embodiments a current transformer may be used to sense the coil current. Other approaches are envisaged.

The free resonance signal 100 of the charging unit 80B, in accordance with the current in the transmit coil(s) 32 of the charging unit 80B is shown in FIG. 5. FIG. 5 also shows that the excitation energy for producing the free resonance signal may take the form of a (e.g. single) pulse 44, produced by the driver circuit 36B in this example. The aforementioned controller may apply the appropriate switching potentials to the gates of the transistors of the driver circuit 36B for producing the pulse 44.

As noted previously, in conventional wireless chargers, the charging of neighbouring wirelessly chargeable devices may adversely affect Q factor measurements owing to interference between the wireless charging signals of those neighbouring wirelessly chargeable devices with the free resonance signal. In accordance with embodiments of this disclosure, this problem may be mitigated or even eradicated as will be described below.

In accordance with embodiments of this disclosure, each charging unit 80A, 80B, 80C is operable to alter its charging PWM duty cycle during a time window in which another charging unit of the wireless charger 50 is performing a Q factor measurement. The time window may be in the range 1-200 µs. In some embodiments, the time window may be in the range 1-100 µs. In the example shown in FIG. 5, the charging units 80A, 80C accordingly alter their charging PWM duty cycle while the charging unit 80B is performing its Q factor measurement.

The alteration of the charging PWM duty cycle of the charging units 80A, 80C may be implemented by the aforementioned controller altering the control signals (potentials) applied to the transistors of the charging units 80A, 80C. The effect of the alteration of the charging PWM duty cycles of the charging units 80A, 80C is to reduce interference from the wireless charging signals of those charging units in the free resonance signal produced by the charging unit 80B.

The alteration of the charging PWM duty cycle during the time window may take a number of forms. In some embodiments, the alteration may involve the reduction of the charging PWM duty cycle, for example by at least 50%. This reduction in the duty cycle may reduce the power of the wireless charging signal provided by each charging unit 80A, 80C, whereby the interference with the free resonance signal produced by the charging unit 80B may be correspondingly reduced. This can result in a more accurate Q factor measurement by the charging unit 80B.

In some embodiments, the alteration of the charging PWM duty cycle during the time window may involve reducing the duty cycle to substantially zero. This may effectively, pause the wireless charging signal of the charging units 80A, 80C briefly (i.e. during the time window), thereby substantially removing most (or even all) of the interference with the free resonance signal produced by the charging unit 80B.

In some embodiments, once the time window has passed, the charging units 80A, 80C may assume that the charging unit 80B has completed its Q factor measurement and thus increase their charging PWM duty cycles to a predetermined charging PWM duty cycle. The predetermined charging PWM duty cycle may be a nominal charging PWM duty cycle used by each charging unit when none of the other charging units of the wireless charger 50 are performing a Q factor measurement. Note that the nominal charging PWM duty cycle may be the same charging PWM duty cycle used by the charging units 80A, 80C before the charging unit 80B began its Q factor measurement. Similarly, the charging unit 80B, having completed its Q factor measurement may start (or resume) wirelessly charging the wirelessly chargeable device 20B using the predetermined charging PWM duty cycle.

Figure 6:
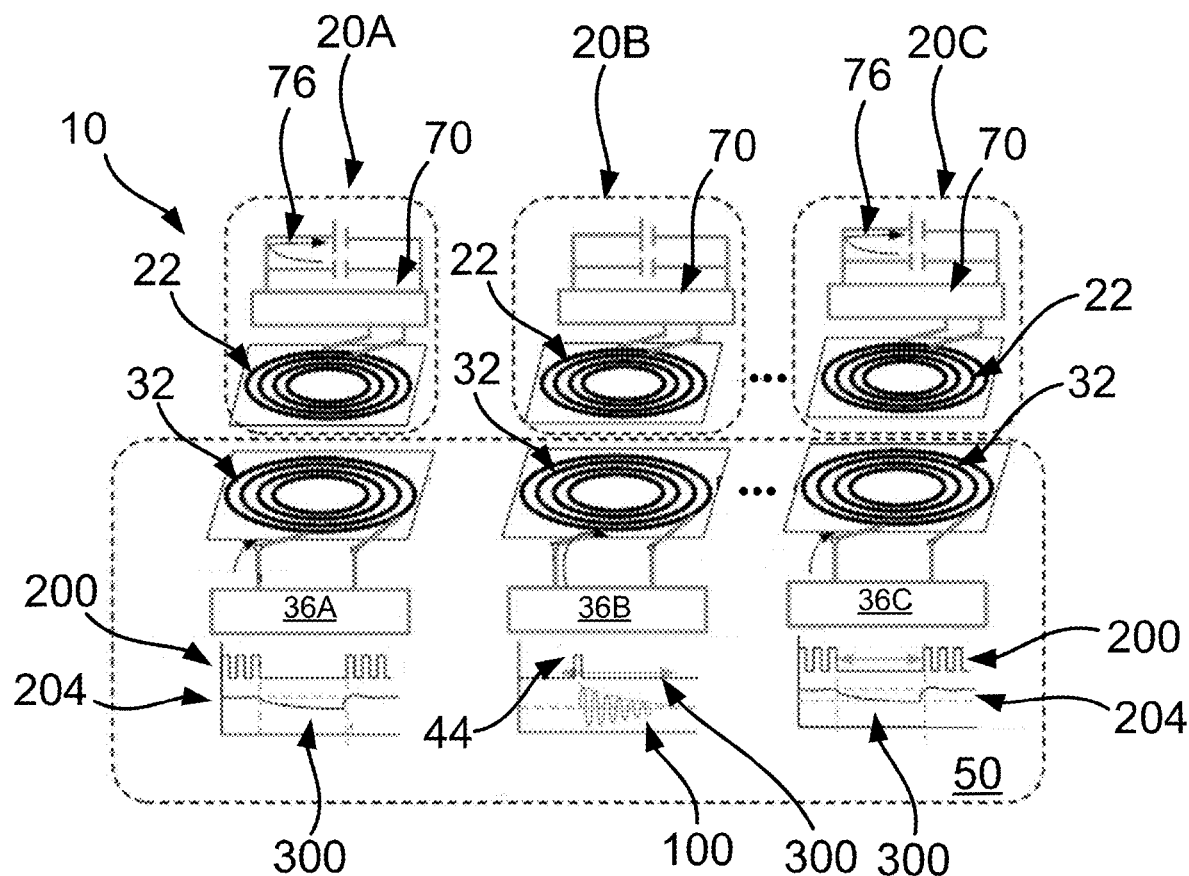
FIG. 6 illustrates the operation of a wireless charger for charging multiple devices according to an embodiment of this disclosure.

Further details regarding the operation of the wireless charger 50 during the time window in which the Q factor measurement is performed are now described in relation to FIG. 6. The wireless charger 50 described above is again shown in FIG. 6, along with the previously described wirelessly chargeable devices 20A, 20B, 20C. FIG. 6 also shows the PWM pulses 200 produced by the driver circuits 36A, 36C for producing the wireless charging signals at their transmit coils 32. The time window 300 is also shown in FIG. 6. Note that the duty cycles of the PWM pulses 200 produced by the driver circuits 36A, 36C fall to substantially zero within the time window 300 in this embodiment, as does the current to the transmit coil(s) 32 of the charging units 80A, 80C.

The pulse 44 produced by the driver circuit 36B for producing the free resonance curve 100 is further shown in FIG. 6. Note that in this embodiment, the pulse 44 occurs at the start of the time window 300.

In accordance with embodiments of this disclosure, the aforementioned capacitor 72 located in each wirelessly chargeable device (e.g. 20A, 20C) may allow the charging current 76 to the battery 74 of that wirelessly chargeable device (e.g. 20A, 20C) to be maintained at least to some extent, during the time window 300. The charging current 76 as a function of time is illustrated in FIG. 6 by the traces 204.

When the charging PWM duty cycles of the charging units 80A, 80C are reduced (e.g. to substantially zero in this embodiment) during time window 300, the capacitor 72 begins to discharge into the battery 74, owing to the temporary absence of the wireless charging signal. The time constant of the capacitor discharge may be chosen so that the discharge current maintains the charging current 76 above a desired level while the Q factor measurement is being performed, despite the absence of the wireless charging signal. In this way, the performance of the Q factor measurement need not lead to the complete cessation of the wireless charging of the wirelessly chargeable devices 20A, 20C during the time window. When the wireless charging resumes at the end of the time window, the capacitor 72 in each wirelessly chargeable device 20A, 20C may be recharged. Thus, the capacitor 72 may store energy to drive charging circuitry of the wirelessly chargeable devices 20A, 20C during the time window 300.

Figure 7:
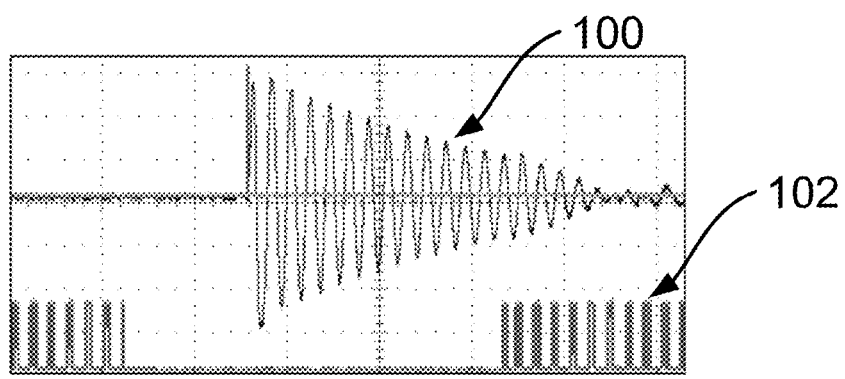
FIG. 7 shows a test Q factor free resonance curve according to an embodiment of this disclosure.

FIG. 7 shows a test Q factor free resonance curve 100 that may be produced by the charging unit 80B. In this embodiment, the alteration of the charging PWM duty cycle during the time window reduces the duty cycle to substantially zero. This is illustrated in FIG. 7 by the pulse width modulated charging signal 102 produced by the driver circuits 36A, 36C. Note that it is envisaged that the free resonance curve 100 need not completely fill the time window. For instance, in FIG. 7, the time window may be considered to start once the PWM duty cycle of the pulse width modulated charging signal 102 is altered (in this embodiment to substantially zero), but there may be a delay between the opening of the time window and the initiation of the free resonance curve 100 as also shown in FIG. 7. Similarly, it is envisaged that the tail of the free resonance curve 100 may extend beyond the end of the time window (this is also illustrated in FIG. 7). While the recommencement of the predetermined PWM duty cycle by the other charging units 80A, 80C may lead to interference distorting the tail of the free resonance curve 100 (again, see FIG. 7), it is envisaged that the undistorted part of the free resonance curve 100 may provide sufficient information for the decay rate of the free resonance curve 100 to be determined (and thus the Q factor).

In some embodiments, the wireless charger 50 may include circuitry for, while a first charging unit (e.g. 80B) of the wireless charger 50 is performing a Q factor measurement, discharging energy from the one or more transmit coil(s) 32 of each other charging unit (e.g. 80A, 80C) of the wireless charger 50. Examples of this will now be described with reference to FIGS. 8 to 11.

Figure 8:
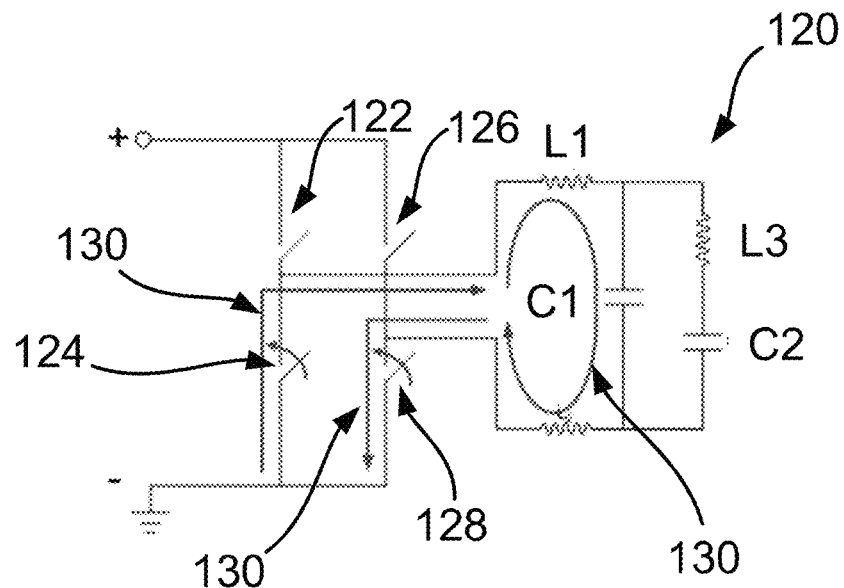
FIG. 8 shows the operation of an LC circuit for a wireless charger according to an embodiment of this disclosure.

FIG. 8 shows the operation of an LC circuit 120 for a wireless charger 50 according to an embodiment of this disclosure. The LC circuit 120 may be incorporated into each of the charging units 80A, 80B, 80C described above. Note that the switches 122, 124, 126, 128 shown in FIG. 8 correspond to the transistors of the driver circuits 36 of the charging units 80 shown in FIG. 5. The inductance L3 in FIG. 8 corresponds to the transmit 32.

In FIG. 8, the loop containing the transmit coil(s) 32 is replaced by an LC network including inductances L1, L2, L3 and capacitances C1 and C2. Inductances L1, L2 and L3, and the capacitance C2 are provided in a loop (in the order: L1, L3, C2, L2), with the ends of the loop coupled to the differential output of the driver circuit 36. The capacitance C1 is coupled between a node located between L1 and L3 and a node between L2 and C2.

When the time window begins, and the charging units 80 of the wireless charger 50, which are not performing a Q factor measurement, reduce their PWM duty cycle (e.g. to substantially zero), a certain amount of energy remains in the circuit containing the transmit coil(s) 32 of these charging units 80. This residual energy may resonate and eventually decay to zero, but in the meantime may produce a residual wireless charging signal, which may interfere with the free resonance signal to some extent, despite the fact that the charging unit 80 is not actively producing a wireless charging signal. To mitigate this, the circuit 120 shown in FIG. 8 acts to drain/discharge this energy from the circuit including the transmit coil(s) 32. In particular, the LC circuit shown in FIG. 8 forms a "π+LC" topology in which the switches 124, 128 each close at or near the start of the time window, thereby to drain the stored energy to ground as illustrated by the current path 130.

Figure 9:
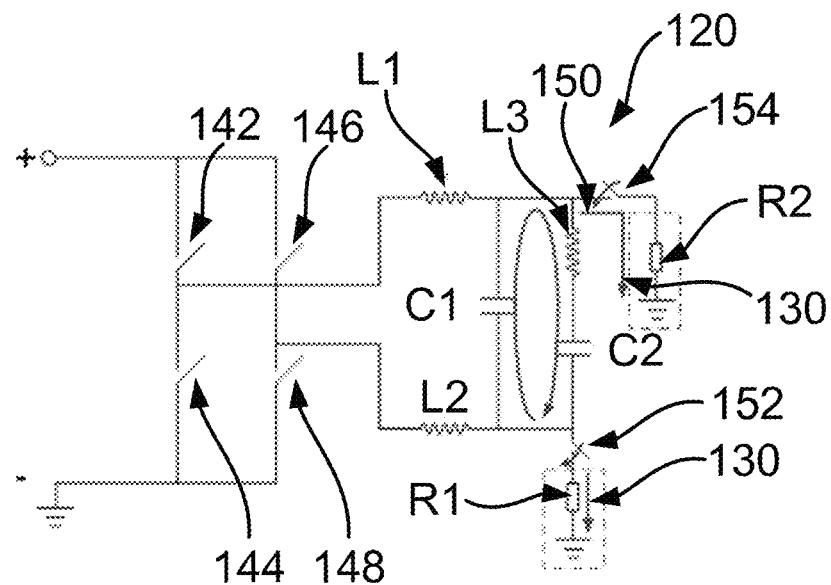
FIG. 9 shows the operation of another LC circuit for a wireless charger according to an embodiment of this disclosure.

Another approach for discharging the energy stored in the circuit containing the transmit coil(s) 32 of each charging unit 80 at the start of the time window is shown in FIG. 9. The arrangement of the inductances L1, L2 and L3, and the capacitances C1, C2 in FIG. 9 are substantially the same as in FIG. 8. However, in this embodiment, the circuit 120 is provided with resistors R1 and R2. R1 is coupled to ground and to a node located between L2 and C2 via a switch 152. R2 is coupled to ground and to a node located between L2 and L3 via a switch 154.

The circuit 120 shown in FIG. 9 acts to drain/discharge the energy from the circuit including the transmit coil(s) 32 at the start of the time window by closing the switches 152, 154 (these switches would typically remain open during normal charging operations outside the time window). This drains the stored energy to ground as illustrated by the current paths 130, thereby preventing the formation of a residual wireless charging signal.

Figure 10:
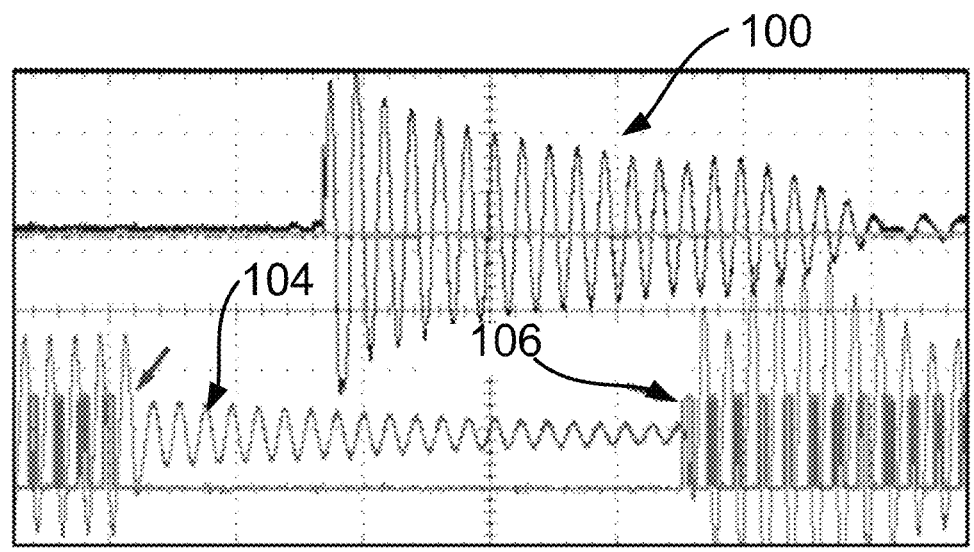
FIGS. 10 and 11 show a number of test curves according to an embodiment of this disclosure.
Figure 11:
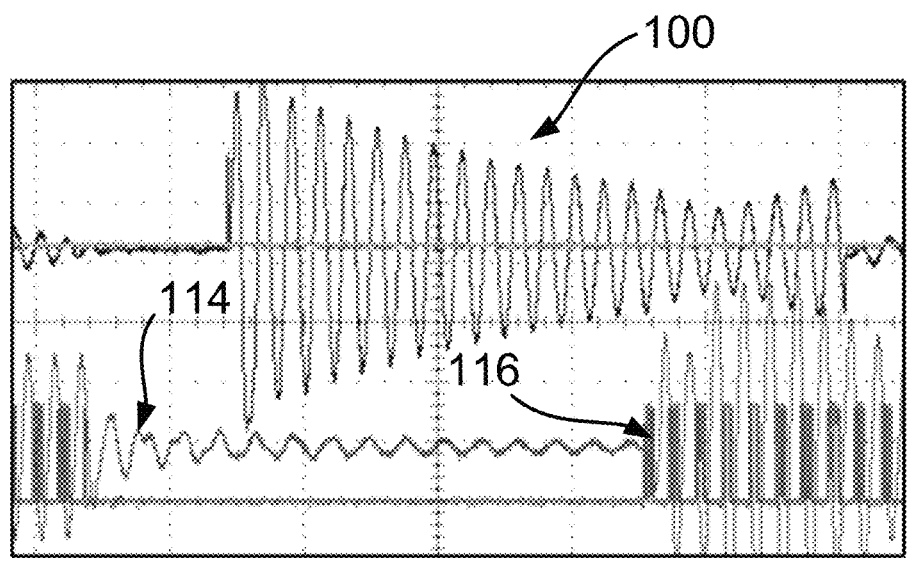

FIGS. 10 and 11 show a number of test curves according to an embodiment of this disclosure.

In particular, FIG. 10 shows:
the free resonance signal 100,
the PWM pulses 106 produced by the driver circuits (e.g. 36A, 36C) which are not performing the Q factor measurement (note that the duty cycle of these pulses 106 fall substantially to zero in the time window in this embodiment), and
the resulting current 104 within the circuit containing the transmit coil(s) 32 of those charging units (e.g. 80A, 80C) which are not performing the Q factor measurement, despite the fact that the duty cycle of the PWM pulses is substantially zero, in the case where a circuit of the kind shown in FIGS. 8 and 9 is not used to discharge the energy in the circuit containing the transmit coil(s) 32 at the start of the time window.

Note that the current 104 decays in the time window as noted above, but may still lead to distortion on the free resonance signal 100 as can be seen in FIG. 10.

On the other hand, FIG. 11 shows:
the free resonance signal 100,
the PWM pulses 116 produced by the driver circuits (e.g. 36A, 36C) which are not performing the Q factor measurement (note that the duty cycle of these pulses 116 fall substantially to zero in the time window in this embodiment), and
the resulting current 114 within the circuit containing the transmit coil(s) 32 of those charging units (e.g. 80A, 80C) which are not performing the Q factor measurement, despite the fact that the duty cycle of the PWM pulses is substantially zero,
in the case where a circuit of the kind shown in FIGS. 8 and 9 is used to discharge the energy in the circuit containing the transmit coil(s) 32 at the start of the time window.

A comparison of FIGS. 10 and 11 reveals that the current 114 decays more quickly in the case of FIG. 11 owing to the operation of the circuitry for discharging the stored energy. This may mitigate the interference caused by the residual wireless charging signal with the free resonance signal 100, as may be appreciated from the more smoothly decaying free resonance signal 100 shown in FIG. 11 compared to FIG. 10.

In some embodiments, there may be provided a wireless charging system comprising a wireless charger 50 of the kind described above and at least one wirelessly chargeable device 20 also of the kind thing described above.

A wireless charging method for simultaneous charging of wirelessly chargeable devices may include a first charging unit (e.g. charging unit 80B as noted above) of a wireless charger 50 performing a Q factor measurement for measuring a Q factor associated with one or more transmit coils 32. The Q factor measurement may involve injecting excitation energy into the one or more transmit coils 32 of that charging unit to produce a free resonance signal as described above. The Q factor measurement may also involve measuring a decay rate of the free resonance signal as described above. The method may also include at least one other charging unit (e.g. charging units 80A and/or 80C as noted above) of the wireless charger 50, during a time window in which the first charging unit is performing the Q factor measurement, altering a charging pulse width modulation, "PWM", duty cycle of that charging unit. As explained previously, this can reduce interference from the wireless charging signal of that charging unit in the free resonance signal produced by the first charging unit.

Accordingly, there has been described a wireless charger, system and method for simultaneous charging of multiple wirelessly chargeable devices. The wireless charger includes a plurality of charging units for charging the wirelessly chargeable devices. Each charging unit includes one or more transmit coils for producing a wireless charging signal. Each charging unit also includes a driver circuit for driving the one or more transmit coils. The driver circuit is switchable according to a charging PWM duty cycle of that charging unit. Each charging unit is operable to perform a Q factor measurement by injecting excitation energy into the one or more transmit coils of that charging unit to produce a free resonance signal, and measuring a decay rate of the free resonance signal. Each charging unit is operable to alter its charging PWM duty cycle during a time window in which another charging unit of the wireless charger is performing a Q factor measurement.

Although particular embodiments of this disclosure have been described, it will be appreciated that many modifications/additions and/or substitutions may be made within the scope of the claims.

The invention claimed is:

1. A wireless charger for simultaneous wireless charging of multiple wirelessly chargeable devices, the wireless charger comprising:
a plurality of charging units, each charging unit for charging a respective one of the wirelessly chargeable devices, each charging unit comprising:
one or more transmit coils for producing a wireless charging signal; and
a driver circuit for driving the one or more transmit coils of that charging unit, the driver circuit comprising at least one transistor, wherein each transistor is switchable according to a charging pulse width modulation (PWM) duty cycle of that charging unit,
wherein each charging unit is operable to perform a Q factor measurement for measuring a Q factor associated with the one or more transmit coils of that charging unit by:
injecting excitation energy into the one or more transmit coils of that charging unit to produce a free resonance signal; and
measuring a decay rate of the free resonance signal, and wherein each charging unit is operable to alter its charging PWM duty cycle during a time window in which another charging unit of the wireless charger is performing a Q factor measurement, for reducing interference from the wireless charging signal of that charging unit in the free resonance signal produced by the other charging unit.

2. The wireless charger of claim 1, wherein the time window is in the range 1-200 μs.

3. The wireless charger of claim 1, wherein each charging unit is operable to alter its charging PWM duty cycle during the time window by reducing the duty cycle.

4. The wireless charger of claim 3, wherein each charging unit is operable to alter its charging PWM duty cycle during the time window by reducing the duty cycle by at least 50%.

5. The wireless charger of claim 4, wherein each charging unit is operable to alter its charging PWM duty cycle during the time window by reducing the duty cycle to substantially zero.

6. The wireless charger of claim 1, wherein each charging unit is operable to increase its charging PWM duty cycle to a predetermined charging PWM duty cycle after the time window has passed.

7. The wireless charger of claim 1, further comprising circuitry for, while a first charging unit of the wireless charger is performing a Q factor measurement, discharging energy from the one or more transmit coils of each other charging unit of the wireless charger.

8. A wireless charging system comprising a wireless charger according to claim 1 and at least one said wirelessly chargeable device.

9. The wireless charging system of claim 8, wherein the wirelessly chargeable device includes a capacitor for storing energy to drive charging circuitry of the wirelessly chargeable device during the time window.

10. A wireless charging method for simultaneous charging of wirelessly chargeable devices, the method comprising:

a first charging unit of a wireless charger performing a Q factor measurement for measuring a Q factor associated with one or more transmit coils of that charging unit by:
   injecting excitation energy into the one or more transmit coils of that charging unit to produce a free resonance signal; and
   measuring a decay rate of the free resonance signal, and
at least one other charging unit of the wireless charger, during a time window in which the first charging unit is performing the Q factor measurement:
   altering a charging pulse width modulation (PWM) duty cycle of that charging unit for reducing interference from the wireless charging signal of that charging unit in the free resonance signal produced by the first charging unit.

11. The wireless charging method of claim 10, wherein the time window is in the range 1-200 μs.

12. The wireless charging method of claim 10, comprising the at least one other charging unit of the wireless charger altering its charging PWM duty cycle during the time window by reducing the duty cycle.

13. The wireless charging method of claim 12, comprising the at least one other charging unit of the wireless charger altering its charging PWM duty cycle during the time window by reducing the duty cycle by at least 50%.

14. The wireless charging method of claim 13, comprising the at least one other charging unit of the wireless charger altering its charging PWM duty cycle during the time window by reducing the duty cycle to substantially zero.

15. The wireless charging method of claim 10, further comprising discharging energy from the one or more transmit coils of the at least one other charging unit while the first charging unit is performing the Q factor measurement.

* * * * *